(12) United States Patent
Fulton et al.

(10) Patent No.: US 10,759,245 B2
(45) Date of Patent: Sep. 1, 2020

(54) AXLE/SUSPENSION SYSTEM WITH DOWN STOP

(71) Applicant: Hendrickson USA, L.L.C., Itasca, IL (US)

(72) Inventors: R. Scott Fulton, Hudson, OH (US); John E. Ramsey, Canton, OH (US); Donald R. Hester, East Canton, OH (US); Benedetto A. Naples, Canton, OH (US); Jacob D. Andreasen, Akron, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 29 days.

(21) Appl. No.: 16/056,645

(22) Filed: Aug. 7, 2018

(65) Prior Publication Data
US 2019/0054787 A1 Feb. 21, 2019

Related U.S. Application Data

(60) Provisional application No. 62/546,069, filed on Aug. 16, 2017.

(51) Int. Cl.
*B60G 7/04* (2006.01)
*B60G 9/00* (2006.01)
(Continued)

(52) U.S. Cl.
CPC .............. *B60G 7/04* (2013.01); *B60G 3/14* (2013.01); *B60G 9/003* (2013.01); *B60G 11/22* (2013.01); *B60G 17/04* (2013.01); *B60G 2200/132* (2013.01); *B60G 2200/31* (2013.01); *B60G 2202/143* (2013.01); *B60G 2202/152* (2013.01); *B60G 2204/143* (2013.01); *B60G 2204/4302* (2013.01); *B60G 2204/4502* (2013.01); *B60G 2300/026* (2013.01); *B60G 2300/04* (2013.01); *B60G 2500/30* (2013.01)

(58) Field of Classification Search
CPC .... B60G 7/04; B60G 9/003; B60G 2202/143; B60G 2500/30; B60G 2500/202;
(Continued)

(56) References Cited

U.S. PATENT DOCUMENTS 2,813,712 A * 11/1957 Stanis ...................... B60G 7/04
267/257
3,966,223 A * 6/1976 Carr ........................ B60G 7/04
280/124.128
(Continued)

FOREIGN PATENT DOCUMENTS

EP 1967394 A1 9/2008

*Primary Examiner* — Paul N Dickson
*Assistant Examiner* — Kurtis Nielson
(74) *Attorney, Agent, or Firm* — Dureska & Moore, LLC; David P. Dureska; Greg Strugalski (57) ABSTRACT

An axle/suspension assembly for a heavy-duty vehicle supported by a frame and a hanger includes a beam, an axle, and a bumper. The axle is supported by a first portion of the beam for pivotal movement of the beam relative to the hanger at a pivot joint. The first portion of the beam is located on a first side of the pivot joint. The bumper is fixed to at least one of the frame, the hanger, and a second portion of the beam. The second portion of the beam is located on an opposite second side of the pivot joint. The bumper includes a portion for contacting structure of at least another of the frame, the hanger, and the beam to limit pivotal movement of the axle in one direction.

20 Claims, 8 Drawing Sheets

(51) Int. Cl.
*B60G 11/22* (2006.01)
*B60G 3/14* (2006.01)
*B60G 17/04* (2006.01)

(58) Field of Classification Search
CPC .... B60G 2202/152; B60G 11/22; B60G 3/14; B60G 17/04; B60G 2200/31; B60G 2300/026; B60G 2200/132; B60G 2204/143; B60G 2204/4302; B60G 2204/4502; B60G 2300/04
See application file for complete search history.

(56) References Cited

U.S. PATENT DOCUMENTS

| | | | |
|---|---|---|---|
| 4,300,787 A | 11/1981 | Vandenberg | |
| 4,310,171 A * | 1/1982 | Merkle | B60G 7/001 267/258 |
| 4,773,670 A * | 9/1988 | Raidel, II | B60G 9/003 280/124.162 |
| 5,171,036 A | 12/1992 | Ross | |
| 5,251,886 A | 10/1993 | Bursel | |
| 5,505,481 A | 4/1996 | VanDenberg et al. | |
| 6,003,885 A | 12/1999 | Richardson | |
| 6,439,587 B2 | 8/2002 | Fabris | |
| 6,752,406 B2 | 6/2004 | Pierce et al. | |
| 7,841,607 B2 * | 11/2010 | Dodd | B60G 11/46 280/124.128 |
| 8,459,666 B2 | 6/2013 | Piehl et al. | |
| 8,485,542 B1 * | 7/2013 | Nine | B60G 9/04 280/124.17 |
| 8,851,492 B2 | 10/2014 | Andreasen et al. | |
| 2002/0163153 A1 | 11/2002 | Conrad | |
| 2007/0222169 A1 | 9/2007 | Smith et al. | |
| 2012/0319366 A1 * | 12/2012 | Yagiela | B60G 9/003 280/6.157 |
| 2014/0197615 A1 * | 7/2014 | Boler | B60G 13/003 280/124.116 |

* cited by examiner

AXLE/SUSPENSION SYSTEM WITH DOWN STOP

CROSS-REFERENCE TO RELATED APPLICATION

This application claims the benefit of U.S. patent application Ser. No. 62/546,069, filed Aug. 16, 2017.

BACKGROUND

The subject disclosure relates generally to axle/suspension systems for heavy-duty vehicles. In particular, the subject disclosure relates to an axle/suspension system with structure that limits pivotal movement of a beam and axle of the axle/suspension system.

Beam-type axle/suspension systems have been used in heavy-duty vehicles for many years. Beam-type axle/suspension systems typically include a pair of suspension assemblies. In some heavy-duty vehicles, the suspension assemblies are connected to a frame or subframe of the vehicle. Reference is made generally to a heavy-duty vehicle for the purpose of convenience with the understanding that such reference includes trucks, tractor-trailers and semi-trailers, trailers, and the like. Reference is made generally to a frame for the purpose of convenience with the understanding that such reference is by way of example and includes main or primary frames, movable subframes or sliders, nonmovable subframes, and the like.

A pair of laterally-spaced hangers is attached to and depends from the frame of the heavy-duty vehicle. The suspension assembly includes a pair of longitudinally-extending elongated beams. Each beam is pivotally mounted at one of its end portions to a respective hanger. An axle extends transversely between, and typically is attached to, the beams at an end or intermediate portion of the beam located opposite the pivotal connection end. The beam end portion opposite the pivotal connection end is also typically connected to an air spring, which is connected to the frame. The axle/suspension system may include a ride-height control valve mounted on the frame or other support structure to adjust the ride-height of the heavy-duty vehicle. Ride-height is defined as a static distance from the bottom of a frame member to a longitudinal central axis of the axle. The ride-height control valve is operatively connectable with the beam and the air spring in order to maintain a desired ride-height of the heavy-duty vehicle. A brake system of the heavy-duty vehicle may be mounted on the axle/suspension system, along with one or more shock absorbers that provide damping to the axle/suspension system, typically if a non-damping air spring is employed.

The axle/suspension system of the heavy-duty vehicle acts to provide ride, handling, and damping characteristics. For example, as the heavy-duty vehicle is traveling over the road, its tires and wheels encounter road conditions that impart various forces, loads, and/or stresses, collectively referred to as forces, to the respective axle on which the tires and wheels are mounted. In turn, the forces are transferred to the suspension assemblies that connect with and support the axle. In order to minimize the detrimental effect of these forces on the heavy-duty vehicle as it is operating, the axle/suspension system is designed to react and/or absorb at least some of the forces.

These forces include vertical forces caused by vertical movement of the tires and wheels as they encounter certain road conditions, fore-aft forces caused by acceleration and deceleration of the vehicle, and lateral and torsional forces associated with transverse vehicle movement, such as turning of the vehicle and lane-change maneuvers. In order to address the application of such different forces, axle/suspension systems have differing structural and operational requirements. The axle/suspension system often needs to be fairly stiff to minimize the amount of sway experienced by, and provide roll stability to, the heavy-duty vehicle. The axle/suspension system also often needs to be relatively flexible to assist in cushioning the vehicle from vertical forces. This provides compliance, allowing the components of the axle/suspension system to withstand the forces and allowing damping of the vibrations or oscillations resulting from such forces. As a result, the axle/suspension system often requires critical components, such as air springs and/or shock absorbers, to cushion the ride of the vehicle from vertical impacts and provide damping characteristics.

Air springs of the type utilized in heavy-duty axle/suspension systems typically include a flexible bellows mounted to the frame and operatively connected to a piston mounted to the beam. Shock absorbers of the type utilized in heavy-duty axle/suspension systems are typically mounted on and extend between the elongated beam and the hanger or the frame of the heavy-duty vehicle and include a cylinder and a piston rod reciprocating within the cylinder. Both air springs and shock absorbers have structural limitations, which limit their ability to extend with downward pivotal movement of the axle.

During operation, the heavy-duty vehicle may strike a pothole or may be lifted onto a railroad car, resulting in the beam of the suspension assembly pivoting or rotating downwardly about the hanger. Similarly, when the heavy-duty vehicle, such as a trailer, is reversing, the trailer brakes may be actuated, referred to as reverse braking, causing the suspension assembly to extend downwardly. In such situations, the air spring and/or shock absorber greatly extend or stretch between the beam and the frame. Both the air spring and shock absorber may be capable of limited extension. Thus, the air spring and/or shock absorber provides some restriction on the relative pivotal movement of the beam of the axle/suspension system. However, the air spring and shock absorber can be damaged if the tensile load produced by the extension exceeds the structural limitations of the air spring and/or shock absorber. As a result, the air spring, shock absorber, and/or other critical components of the axle/suspension system may be damaged. Thus, it is desirable for the axle/suspension system to minimize damage to such critical components. Specifically, it is desirable to limit pivotal movement of the beam about the hanger to prevent over-extension of the air spring and/or shock absorber.

In some heavy-duty vehicles, devices that operate in tension, such as chains, straps, cables, wire ropes, or the like, have been used to minimize the possible damage to the air spring and/or shock absorber as a result of over-extension. These devices are generally disposed between the hanger or frame of the heavy-duty vehicle and the beam of the suspension assembly to act as positive mechanical limiting structures, or down stops. The devices limit the pivotal movement of the beam of the suspension assembly, reducing the extension or stretching that the air spring and/or shock absorber may experience. These devices minimize the possibility of potential damage to the air spring, shock absorber, and/or other components of the axle/suspension system. Because these devices are disposed beneath the heavy-duty vehicle, they may be exposed to road splash and debris that could damage the devices. The devices are often manufactured to be relatively robust in order to withstand the weight of and forces acting on the axle/suspension system. This results in the devices increasing the weight and cost of operating the heavy-duty vehicle while decreasing available space in the already limited undercarriage of the heavy-duty vehicle and axle/suspension system.

Thus, a need exists for an axle/suspension system for a heavy-duty vehicle that provides a positive mechanical down stop that is simple, durable, light weight, and compact and that limits pivotal movement of the beam to avoid potential damage to the air spring, shock absorber, and/or other components of the axle/suspension system during operation of the vehicle.

SUMMARY

This summary is provided to introduce concepts that are in the description. This summary is not intended to identify key factors or essential features of the subject disclosure, nor is it intended to be used to limit the scope of the subject disclosure.

The axle/suspension system for a heavy-duty vehicle of the subject disclosure solves problems associated with prior art axle/suspension systems utilizing chain stops or other devices that operate in tension. The axle/suspension system of the subject disclosure provides a mechanical down stop for limiting the downward movement of the axle/suspension system while operating in a compression mode. The axle/suspension system of the subject disclosure provides a mechanical down stop that is positioned to be better protected from exposure to road splash and debris. The axle/suspension system of the subject disclosure provides a mechanical down stop that is more compact with fewer components, is less costly to manufacture, requires less assembly time and complexity, and is relatively lighter in weight than prior art down stops, reducing the weight of the heavy-duty vehicle and occupying less space in the undercarriage or axle/suspension system.

According to an aspect of the subject disclosure an improved axle/suspension assembly for a heavy-duty vehicle is supported by a frame member of the heavy-duty vehicle and a hanger. The axle/suspension assembly includes a beam. An axle is supported by a first portion of the beam for pivotal movement relative to the hanger at a pivot joint. The first portion of the beam is located on a first side of the pivot joint. The axle/suspension system has a bumper. The bumper is fixed to one or more of the frame, the hanger, and a second portion of the beam, which is on an opposite second side of the pivot joint. The bumper has a portion for contacting a component associated with at least another of the frame member, the hanger, and the beam to limit relative pivotal movement of the beam and axle in one direction.

The axle/suspension assembly also may include an engagement portion having a surface for contacting the bumper to limit relative pivotal movement of the beam and axle in the one direction. The engagement member may be fixed to or integral with at least one of the frame, the hanger, and the beam.

DESCRIPTION OF THE DRAWINGS

The following description and drawings set forth certain illustrative aspects and implementations of the subject disclosure. These are indicative of but a few of the various ways in which one or more aspects and implementations may be utilized. Further features of the subject disclosure will become apparent to those skilled in the art from reading the description with reference to the accompanying drawings, in which.

Similar reference characters identify similar parts and directions throughout the drawings.

DESCRIPTION

The present subject matter is described with reference to the drawings, in which like reference characters are used to refer to like components and constituents of orientation throughout the description. Exemplary details are set forth in order to provide an understanding of the subject disclosure. It will be understood, however, that the subject disclosure can be practiced without these specific details. It will also be understood that these specific details are not to be construed as limiting.

Figure 1:
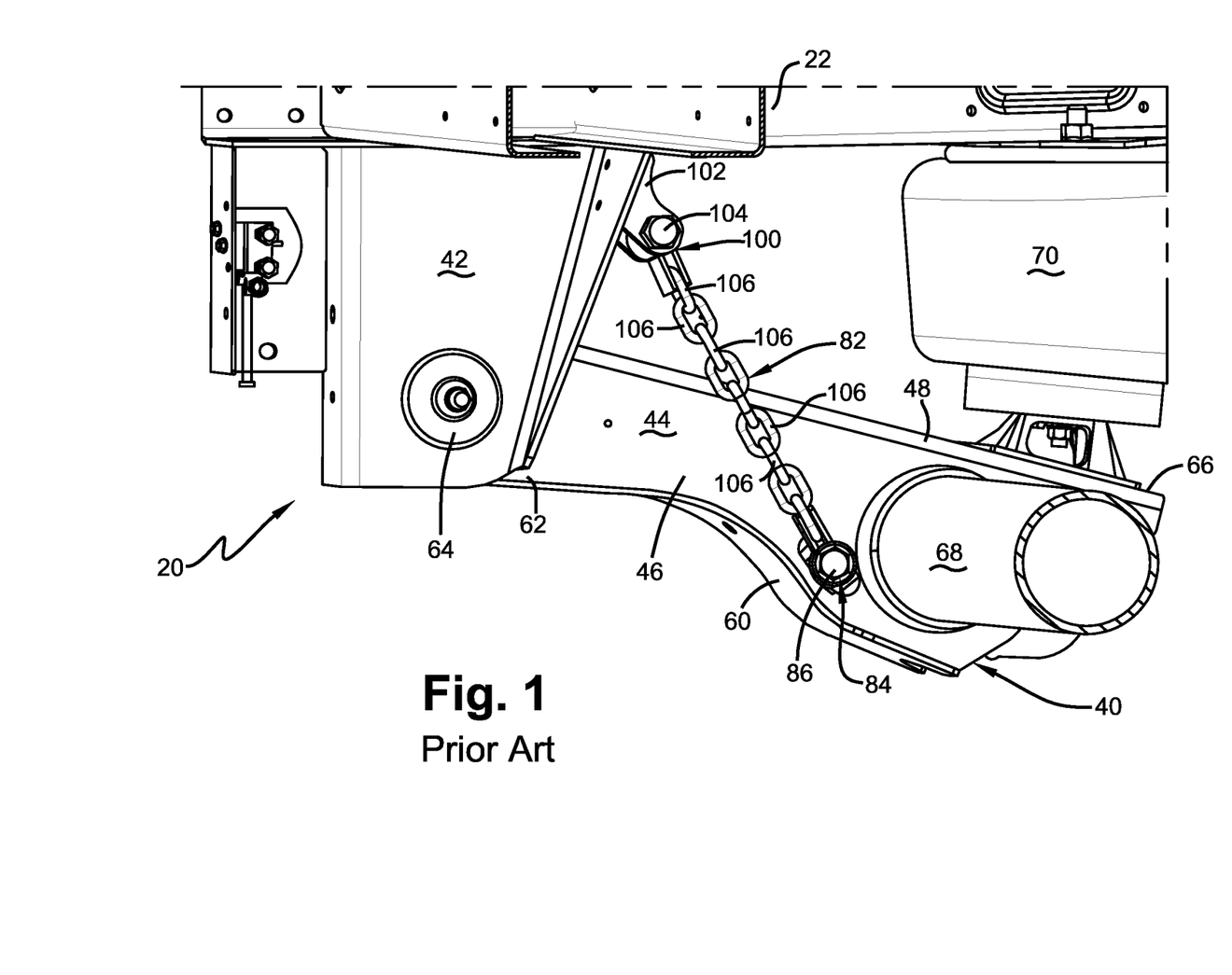
FIG. 1 is a fragmentary side elevation view, looking in an outboard direction with a portion in section, of a portion of a prior art axle/suspension system utilizing a chain stop.

In order to better understand the axle/suspension system for a heavy-duty vehicle of the subject disclosure, a prior art trailing arm beam-type axle/suspension system 20 is illustrated in FIG. 1. Reference is made generally to a trailing arm axle/suspension system for the purpose of convenience with the understanding that such reference includes beams which extend either rearward or frontward with respect to the front end of the heavy-duty vehicle. The prior art axle/suspension system is mounted to a pair of longitudinally-extending spaced-apart members of frame 22 of a heavy-duty vehicle (not shown). The axle/suspension system 20 generally includes a pair of laterally spaced suspension assemblies 40. Because the suspension assemblies 40 are identical, for sake of clarity and brevity, only one of the suspension assemblies will be described.

The suspension assembly 40 includes a beam 44 that is pivotally connected to a hanger 42. The beam 44 has an inverted general U-shape cross-section forming an open portion (not shown) between a pair of laterally spaced sidewalls 46 and a top portion 48. The open portion of the beam 44 faces generally downward, or away from the frame 22 of the heavy-duty vehicle. A bottom plate 60 extends between and is attached to the lowermost ends of the sidewalls 46 by any suitable means, such as welding, to complete and close the bottom of the structure of the beam 44. The beam 44 includes a front end portion 62 and a rear end portion 66. The front end portion 62 has a pivotal connection 64, such as a bushing assembly, as is known, to connect the beam with the hanger 42 for relative pivotal movement. A transversely extending axle 68 is received, supported by, and fixed to the beam 44 by suitable means, such as welding. The suspension assembly 40 also includes an air spring 70 mounted to and extending between the frame 22 and the rear end portion 66 of the beam 44. The suspension assembly 40 may be supplied with a shock absorber (not shown) to provide damping, either solely or as a supplement to the air spring 70, if the air spring has damping capabilities.

During operation of the heavy-duty vehicle, downward pivotal movement of the beam 44 and axle 68 may occur, such as when the axle/suspension system suddenly drops as a result of a pothole or other road hazard, reverse braking, or the trailer being lifted onto a railroad car. The air spring 70 and/or shock absorber may have some limited ability to restrict or prevent the beam 44 and axle 68 of the suspension system 20 from pivoting downward an excessive amount. However, the air spring 70 and shock absorber can be damaged if the tensile load produced by the extension exceeds the structural limitations of the air spring and/or shock absorber. As a result, the air spring 70, the shock absorber, and/or other components of the axle/suspension system 20 may be damaged.

Thus, additional structure may be desirable or required in order to limit or prevent excessive downward movement of the beam 44 and axle 68 and overextension of and potential damage to the air spring 70, the shock absorber, and/or other components of the axle/suspension system 20. The additional structure is typically in the form of a chain 82. Devices other than chains, such as straps, cables, wire ropes, and the like, may be similarly utilized. The chain 82 includes a bottom end portion 84, a top end portion 100, and a plurality of links 106. The bottom end portion 84 attaches to the beam 44 by suitable means, such as a fastener 86. The top end portion 100 is connected to a mounting bracket 102 by suitable means, such as a fastener 104. The mounting bracket 102 is attached to the hanger 42 or the frame 22 by welding or other suitable means. The chain 82 acts in tension to limit the downward pivotal movement of the beam 44 of the suspension assembly 40. The number, size, and dimension of links 106 establishes the range of the downward pivotal movement of the beam 44 permitted by the chain 82. The chain 82 reaches its extensible limit before the air spring 70 or shock absorber extends beyond structural limitations. Thus, the chain 82 helps to prevent damage to the air spring, 70, the shock absorber, and/or other components of the axle/suspension system 20.

The prior art axle/suspension system 20, while providing a mechanical stop that limits the pivotal movement of the beam 44 and axle 68, has limitations, drawbacks, and disadvantages. The chain 82 of the prior art axle/suspension system 20 undesirably increases the weight and cost of operation of the heavy-duty vehicle and reduces the amount of space available in the undercarriage for other components. The chain 82 of the prior art axle/suspension system 20 is also exposed to and prone to damage from road splash and debris.

The improved axle/suspension system for a heavy-duty vehicle according to the subject disclosure overcomes the limitations, drawbacks, and disadvantages of the prior art axle/suspension system 20. The axle/suspension system of the subject disclosure provides a cost-efficient, relatively simpler, lighter, and more compact mechanical down stop that is sheltered or better protected from road splash and debris.

Figure 2:
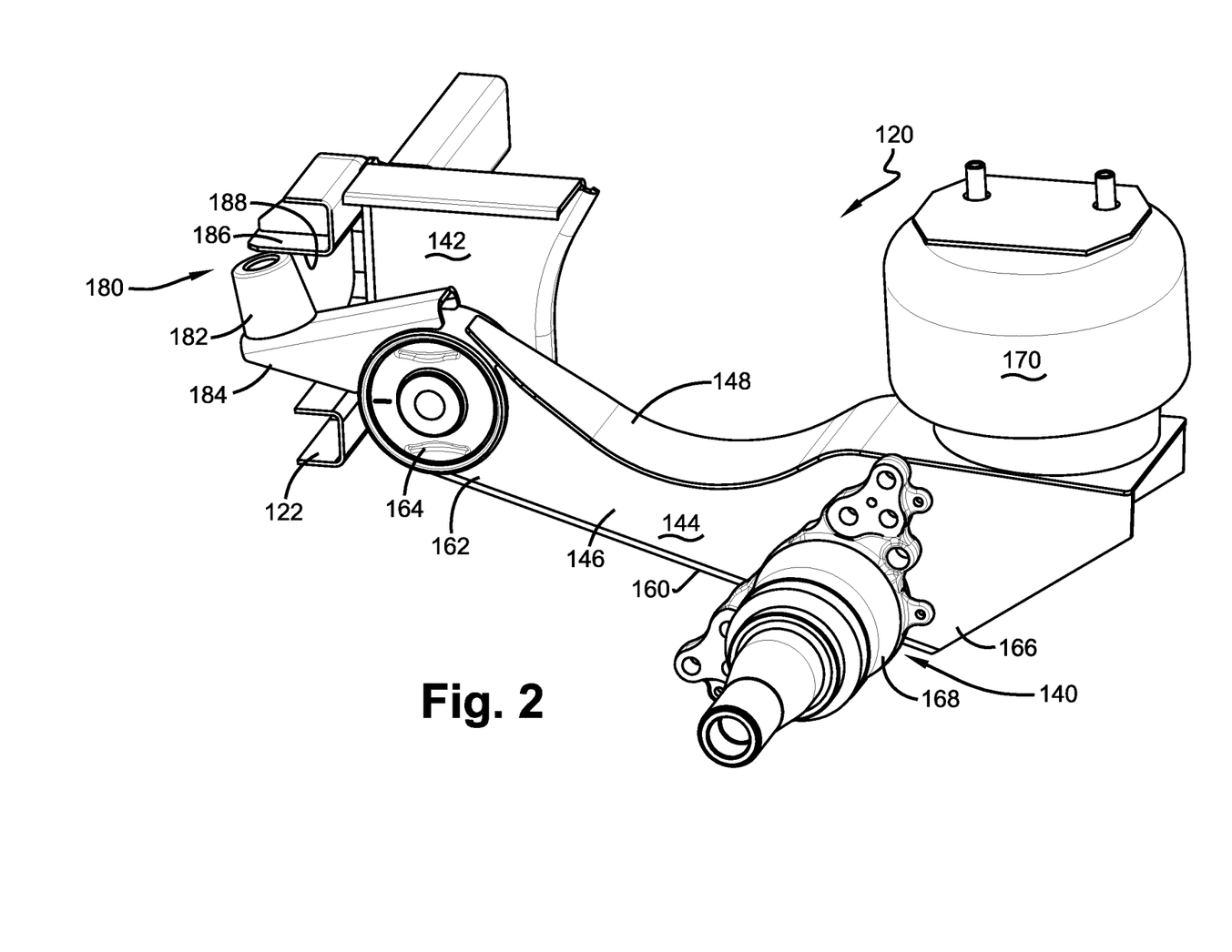
FIG. 2 is a fragmentary perspective view of a portion of an axle/suspension system, according to an aspect of the subject disclosure, incorporating a down stop.

An axle/suspension system for a heavy-duty vehicle 120, according to one aspect of the subject disclosure, is illustrated in FIG. 2. The axle/suspension system 120 is typically mounted to, and supported by, longitudinally-extending and/or transversely-extending spaced-apart members of a frame 122 of the heavy-duty vehicle (not shown). The axle/suspension system 120 generally includes a pair of laterally spaced suspension assemblies 140. Because the suspension assemblies 140 are identical, for the sake of clarity and brevity, only one of the suspension assemblies will be described, and it is understood that such description applies equally to all suspension assemblies 140.

The suspension assembly 140 includes a hanger 142 made up of two hanger side portions (only one hanger side portion is shown for clarity and exemplary purposes in FIGS. 2-5) fixed to the frame 122. The hanger 142 may be formed from a suitably thick and strong metal material, such as steel. The suspension assembly 140 includes a beam 144 pivotally connected to the hanger 142. The beam 144 is illustrated in a trailing arm configuration, but may include other configurations, such as leading arm. The beam 144 may be formed from any suitable manufacturing method and material, such as bent plate steel. The beam 144 includes a top plate 148, a pair of outboard and inboard sidewalls 146, and a bottom wall 160. Top plate 148, sidewalls 146, and bottom wall 160 may be separately formed out of any suitable rigid material, such as a metal, and joined by suitable means, such as welding. Alternatively, two or more of top plate 148, sidewalls 146, and bottom wall 160 may be formed as a single piece of steel and then bent to form two or more wall surfaces or a generally U-shaped structure to form three walls. In some configurations, top plate 148 and bottom wall 160 may overlap sidewalls 146. The top plate 148, sidewalls 146, and bottom wall 160 may be formed from other materials, shaped or connected together in other ways, and/or even be formed from a single piece of composite material. The beam 144 also includes a front portion 162 and a rear portion 166. A bottom wall 160 extends between sidewalls 146 to close the beam 144. The front end portion 162 includes a pivotal connection 164, such as a bushing assembly, as is known, to connect the beam 144 with the hanger 142 for relative pivotal movement, as is known. The beam 144 also may include an extension 184 located forward of the pivotal connection 164. The extension 184 is on a side of the pivotal connection 164 opposite the front end portion 162. The extension 184 may be a separate component permanently attached to the beam 144 by suitable means, such as welding. Alternatively, the extension 184 may be formed with the beam 144 as a single piece.

A transversely extending axle 168 (FIG. 2) is received, supported by, and fixed to the beam 144 by suitable means, such as welding or fastening. The axle 168 is generally supported by an intermediate portion of the beam 144 extending rearward of the pivotal connection 164. Specifically, the axle 168 is supported by a portion of the beam 144 between the pivotal connection 164 and the rear end portion 166. In the alternative, the axle 168 may be supported by a portion of the beam 144 adjacent to, or rearward of, the rear end portion 166.

The suspension assembly 140 also includes an air spring 170 mounted to and extending between the frame 122 and the rear end portion 166 of the beam 144. The suspension assembly 140 may be supplied with a shock absorber (not shown) to provide damping. Alternatively, the air spring 170 may be designed and constructed to provide damping characteristics. As a result, the air spring 170 may work in conjunction with, or eliminate the need for, the shock absorber.

The suspension assembly 140 also includes a new and improved down stop assembly 180. The down stop assembly 180 includes a bumper 182 and an engagement member 186. The bumper 182 is mounted to the extension 184 of the beam 144, such that it extends generally upwardly from the extension and is, thus, shielded from road splash and debris. Alternatively, the bumper 182 may be mounted to any of the beam 144, the frame 122, or the hanger 142. The bumper 182 may be an existing structure of any of the frame 122, the hanger 142, and the beam 144. The bumper 182 may be formed from any material with sufficient rigidity and durability, such as synthetic polymers, elastomers, rubbers, or composites. It is to be understood that bumper 182 may also be formed of metal or metal composite materials. The bumper 182 may be generally cylindrical or frustoconical in shape and may include a centralized depression or opening through which a fastener (not shown) may be inserted to attach the bumper to the extension 184. Alternatively, other appropriate connectors or attachment means may be used to attach the bumper 182 to the extension 184.

A lift bag 183 (FIG. 5) may be used in place of the bumper 182. Alternatively, the bumper 182 may be used in conjunction with the lift bag 183, as shown. The lift bag 183 may be attached to the bumper 182 or adjacent the bumper and frame 122, and extend between the bumper and components associated with the hanger 142 and/or the frame of the heavy-duty vehicle. The lift bag 183 may be operatively connected to a ride-height control valve (not shown) and the air spring 170. This would allow the lift bag 183 and bumper 182 to act as a suspension assembly lift mechanism capable of altering the ride-height of the axle/suspension system 120.

The engagement member 186 may be a separate component, such as a structure or surface, attached to the hanger 142, the frame 122, the beam 144, or the extension 184. Depending on the arrangement of the bumper 182 and suspension assembly 140, the engagement member 186 may be an existing component of the frame 122, the hanger 142, or the beam 144. The engagement member 186 includes a surface 188 for the bumper 182 to engage and restrict pivotal movement of the beam 144 and axle 168 about the pivotal connection 164. The configuration and relative positioning of the bumper 182 and the engagement member 186 determines the range of pivotal movement of the beam 144 and the axle 168. Specifically, downward pivotal movement of the beam 144 and axle 168 may be restricted a predetermined amount, such as to about 12°, or about 4 inches from a ride-height of the heavy-duty vehicle. However, it is contemplated that the bumper 182 and/or engagement member 186 may allow for adjustment in order to provide a customized amount of pivotal movement of the beam 144 and the axle 168 for a particular heavy-duty vehicle application.

Figure 3:
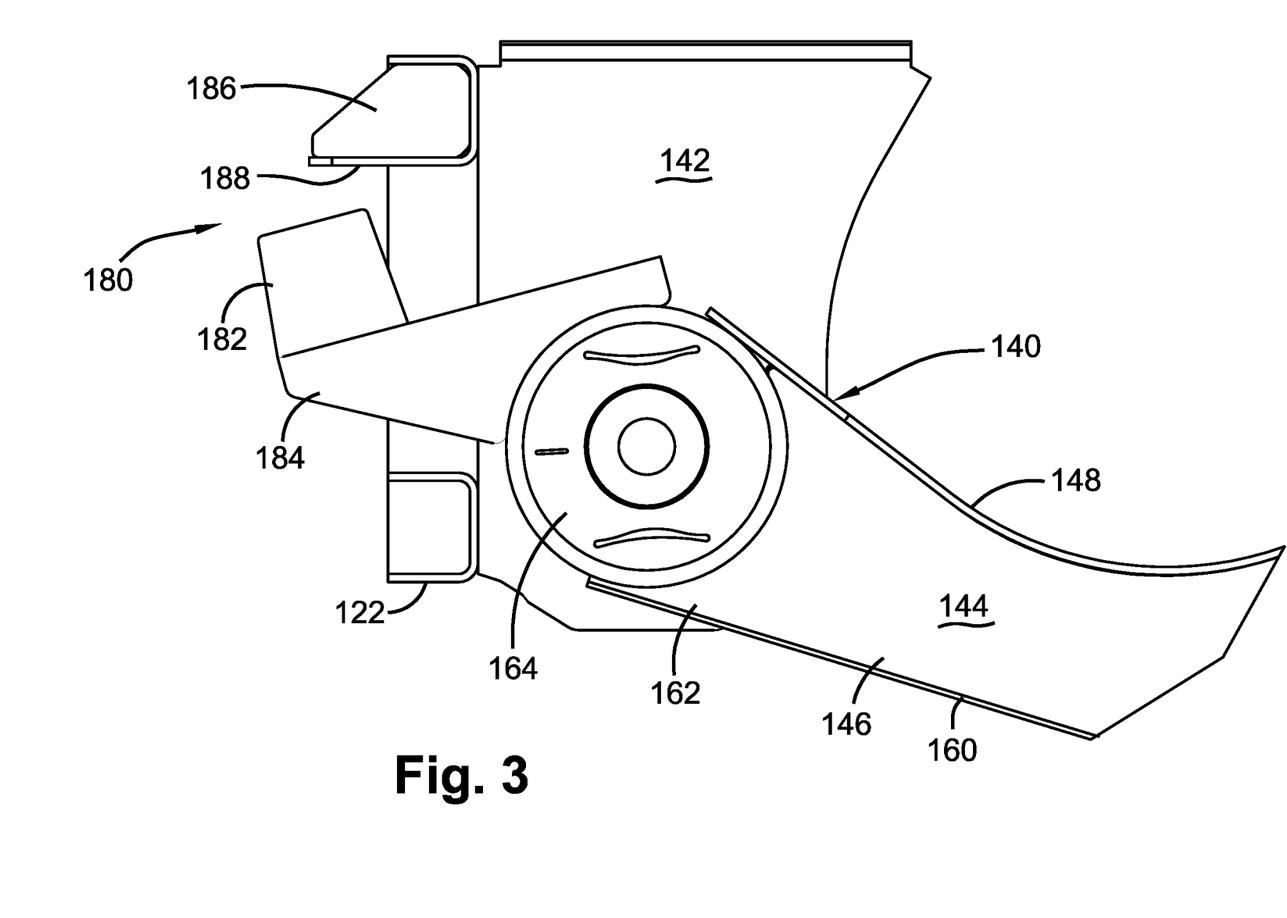
FIG. 3 is a fragmentary side elevation view of the portion of the axle/suspension system, illustrated in FIG. 2, with some components in one relative position.
Figure 4:
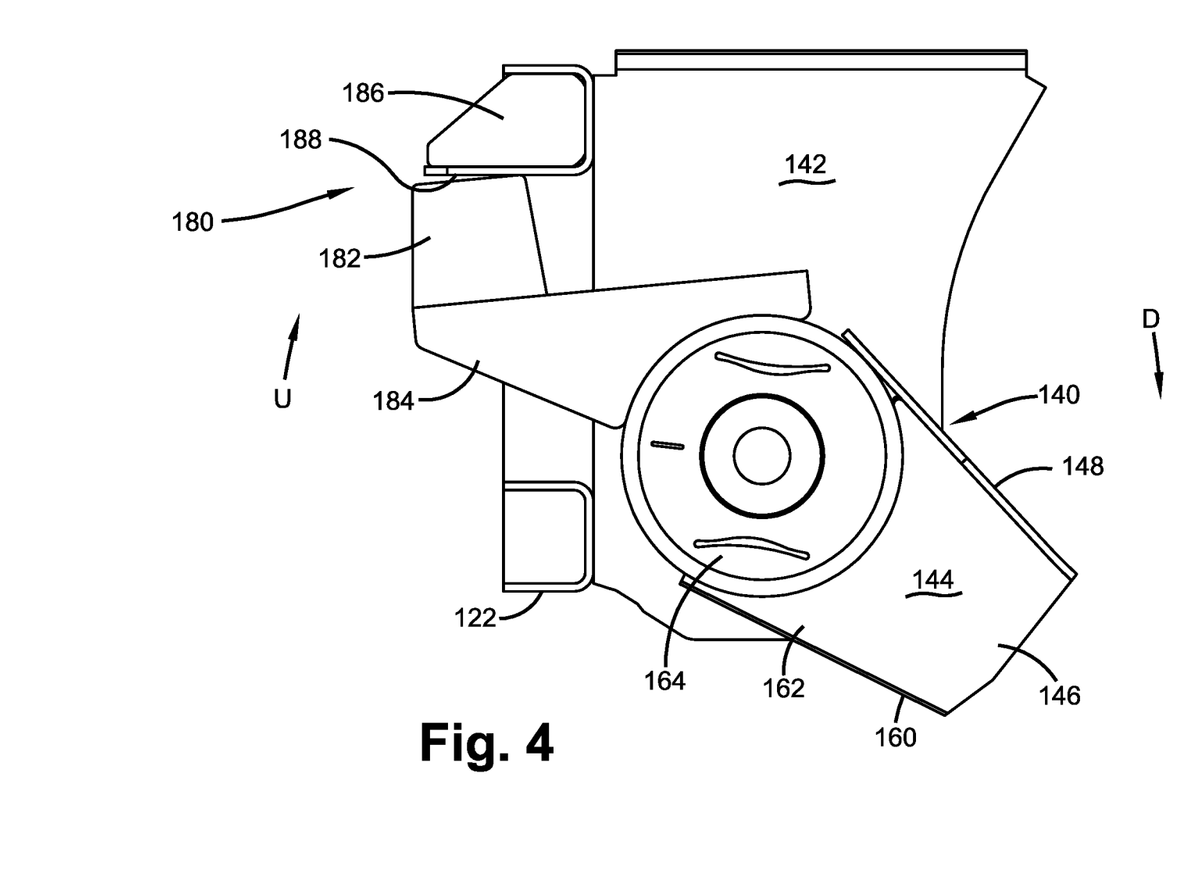
FIG. 4 is a fragmentary side elevation view of the portion of the axle/suspension system illustrated in FIG. 3, with some components in another relative position.
Figure 5:
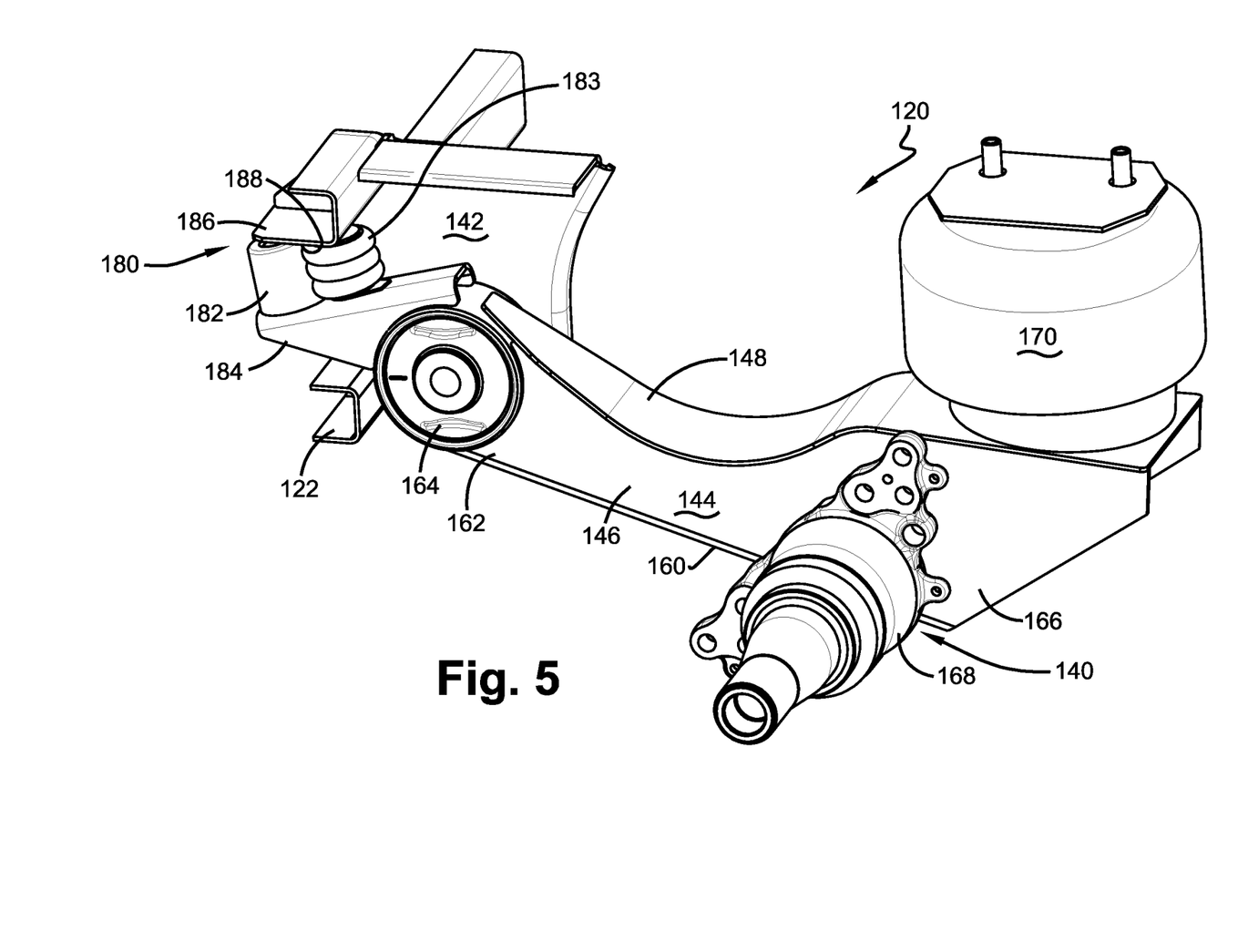
FIG. 5 is a fragmentary perspective view of the portion of the axle/suspension system illustrated in FIG. 2, incorporating a lift bag.

As illustrated in FIG. 3, the bumper 182 is spaced apart from, or not in contact with, the engagement member 186 or any component of the hanger 142 or the frame 122 of the heavy-duty vehicle when the beam 144 and axle 168 are at a typically neutral ride-height. As the beam 144 and axle 168 pivot downward in the direction D (FIG. 4) and approach their downward travel limit, the extension 184 correspondingly pivots upward in the direction U about the pivotal connection 164. As illustrated in FIG. 4, this results in the bumper 182 engaging the surface 188 of the engagement member 186 or other components (not shown) associated with the frame 122 or the hanger 142. This contact with the surface 188 restricts downward pivotal movement of the beam 144 and axle 168 about the pivotal connection 164. As a result, the limited pivotal movement of the beam 144 and axle 168 helps prevent over-extension of, and avoid potential damage to, the air spring 170 and/or other components of the axle/suspension system 120 when the heavy-duty vehicle is lifted onto a railroad car, undergoes reverse braking, or strikes a pothole or other road hazard.

Figure 6:
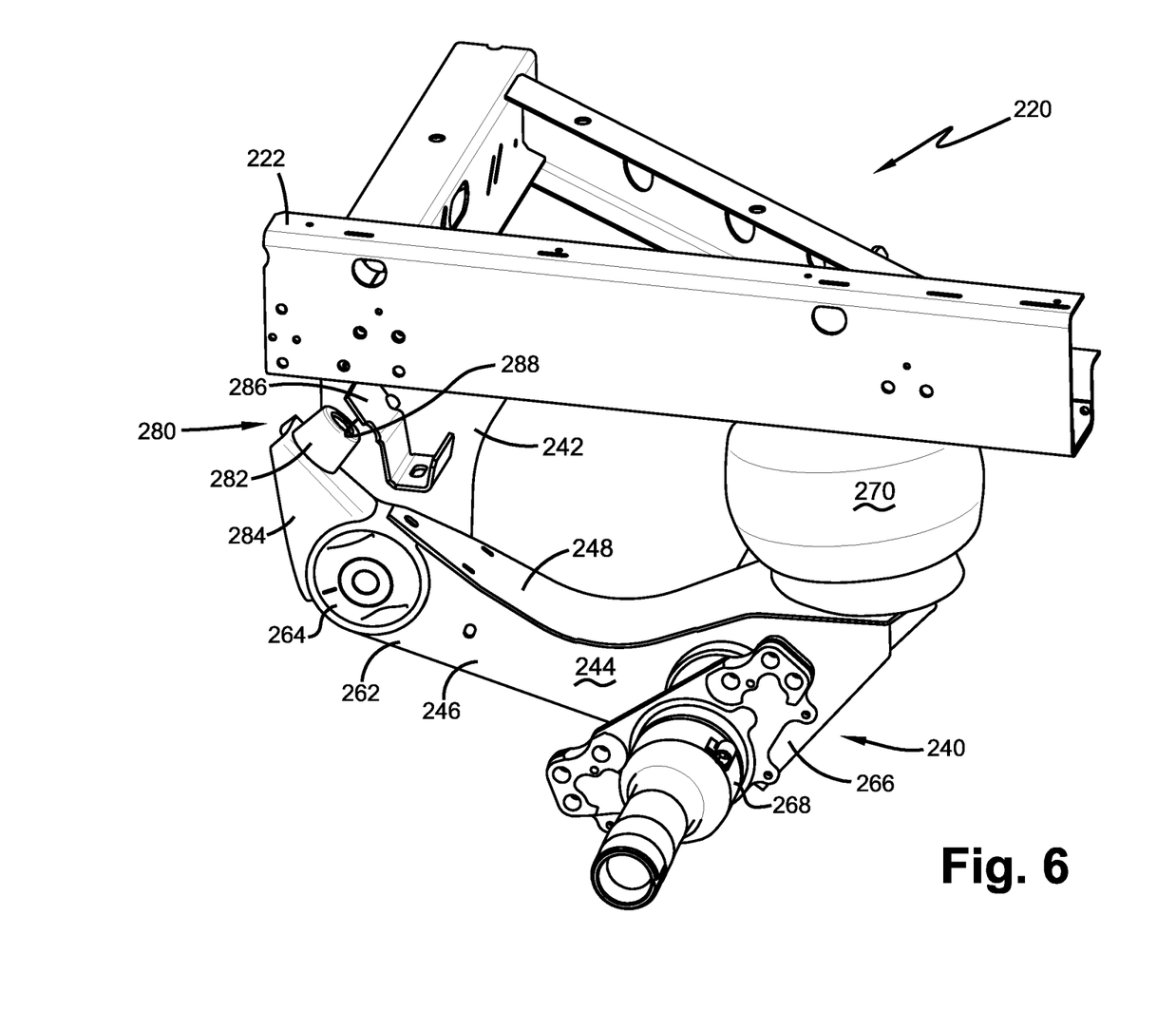
FIG. 6 is a fragmentary perspective view of a portion of an axle/suspension system, according to another aspect of the subject disclosure, incorporating a down stop.

An axle/suspension system for a heavy-duty vehicle 220, according to another aspect, is illustrated in FIG. 6. The axle/suspension system 220 is mounted to a pair of longitudinally-extending and/or transversely-extending spaced-apart members of a frame 222 of a heavy-duty vehicle (not shown). The axle/suspension system 220 generally includes a pair of laterally spaced suspension assemblies 240. Because the suspension assemblies 240 are identical, for the sake of clarity and brevity only one of the suspension assemblies will be described.

Figure 7:
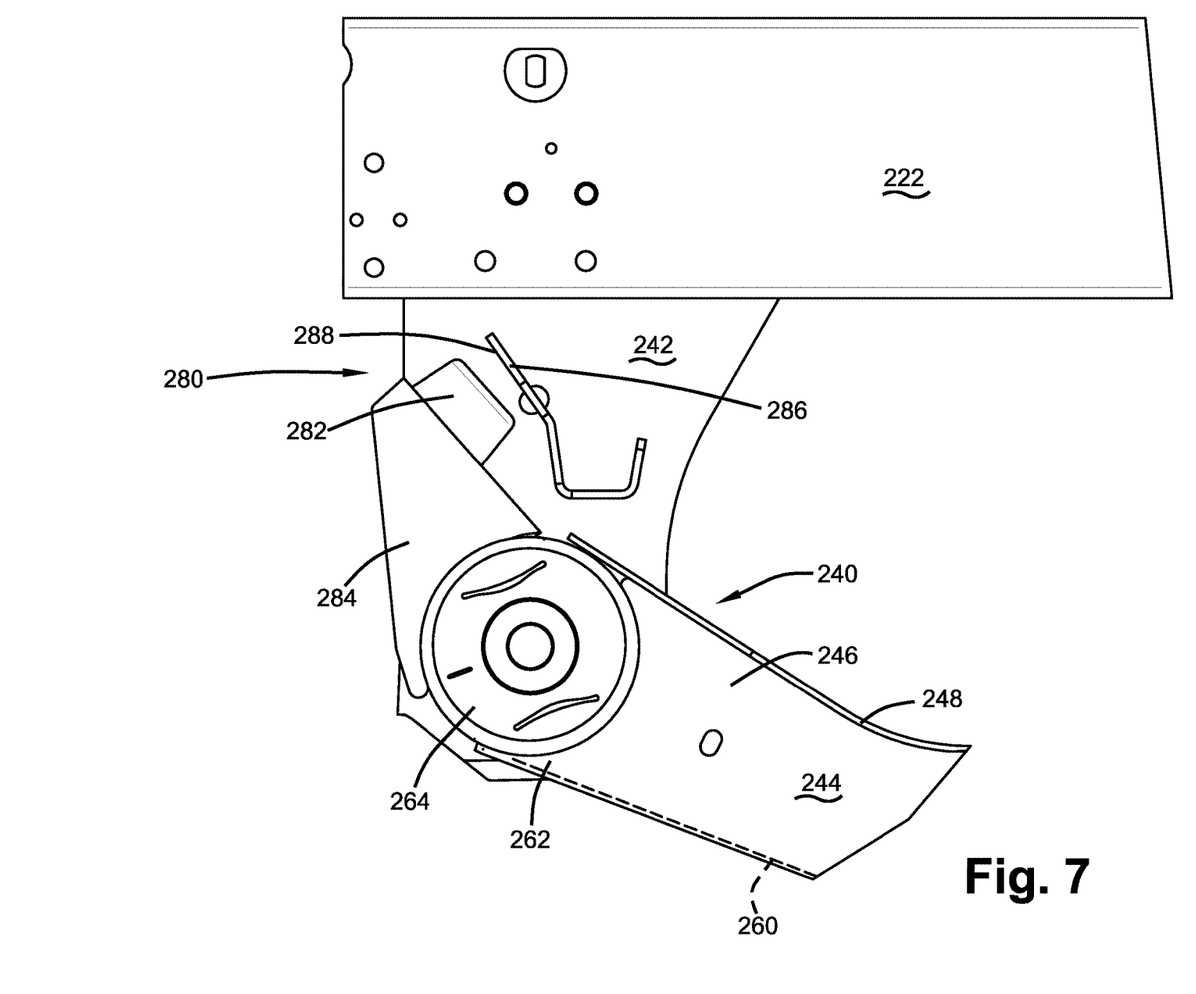
FIG. 7 is a fragmentary side elevation view of the portion of the axle/suspension system illustrated in FIG. 6, with some components in one relative position.
Figure 8:
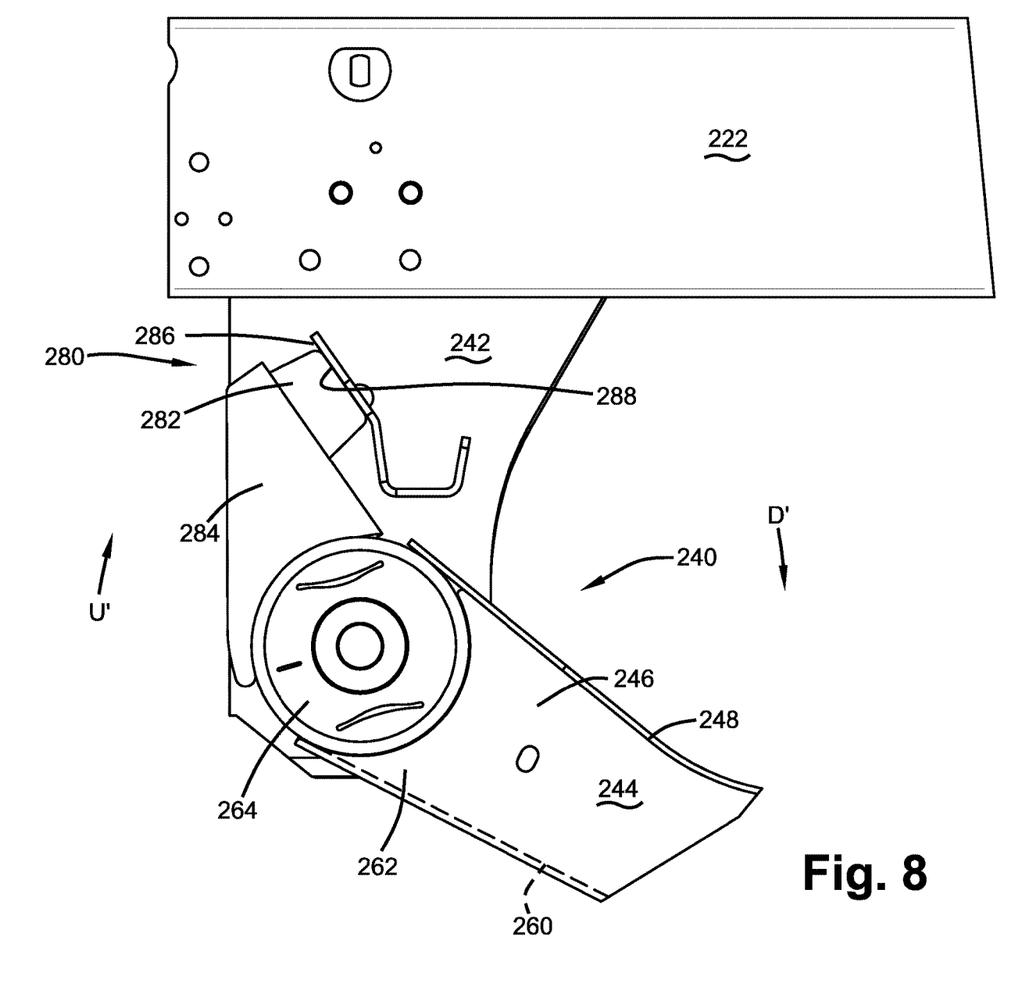
FIG. 8 is a fragmentary side elevation view of the portion of the axle/suspension system illustrated in FIG. 7, with some components in another relative position.

The suspension assembly 240 includes a hanger 242 made up of two hanger side portions (only one hanger side portion is shown for clarity and exemplary purposes in FIGS. 6-8) fixed to the frame 222. The hanger 242 may be formed from a suitably thick and strong metal material, such as steel. A beam 244 is pivotally connected to the hanger 242. The beam 244 includes a top plate 248, a pair of outboard and inboard sidewalls 246, and a bottom wall 260. Top plate 248, sidewalls 246, and bottom wall 260 may be separately formed out of any suitable rigid material, such as a metal. Alternatively, two or more of top plate 248, sidewalls 246, and bottom wall 260 may be formed as a single piece of steel and then bent to form two or more wall surfaces or a generally U-shaped structure to form three walls. In some configurations, top plate 248 and bottom wall 260 may overlap sidewalls 246. The top plate 248, sidewalls 246, and bottom wall 260 may be formed from other materials, shaped or connected together in other ways, and/or even be formed from a single piece of composite material. The beam 244 also includes a front end portion 262 and a rear end portion 266. The front end portion 262 includes a pivotal connection 264, such as a bushing assembly, as is known, to connect the beam 244 with the hanger 242 for relative pivotal movement. The beam 244 also includes an extension 284 located forward of the pivotal connection 264 on a side of the bushing assembly opposite the front end portion 262. The extension 284 may be a separate component that is fixed to the beam 244 by suitable means, such as welding. Alternatively, the extension 284 may be formed with the beam 244 as a single piece.

A transversely extending axle 268 is received, supported by, and is fixed to the beam 244 by suitable means, such as welding or fastening. The axle 268 is supported by an intermediate portion of the beam 244 located rearward of the pivotal connection 264. Specifically, the axle 268 may be supported by the intermediate portion of the beam 244 between the pivotal connection 264 and the rear end portion 266. In the alternative, the axle 268 may be supported by a portion of the beam 244 at the rear end portion 266.

The suspension assembly 240 also includes an air spring 270 mounted to, and extending between, the frame 222 and the rear end portion 266 of the beam 244. The suspension assembly 240 may be supplied with a shock absorber (not shown) to provide damping. Alternatively, the air spring 270 may be designed and constructed to provide damping characteristics, and used with or without one or more shock absorbers.

The suspension assembly 240 also includes a new and improved down stop assembly 280. The down stop assembly 280 includes a bumper 282. The bumper 282 is mounted to the extension 284 of the beam 244, such that it extends generally upwardly from the extension and is, thus, shielded from, road splash and debris. Alternatively, the bumper 282 may be mounted directly or indirectly to any of the beam 244, the frame 222, or the hanger 242. The bumper 282 may be an existing structure of any of the frame 222, the hanger 242, and the beam 244. The bumper 282 may be formed from any material with sufficient rigidity and durability, such as synthetic polymers, elastomers, rubbers, or composites. It is to be understood that bumper 282 may also be formed of metal or metal composite materials. The bumper 282 is generally cylindrical or frustoconical in shape and may include a centralized depression or opening through which a fastener (not shown) may be inserted to attach the bumper to the extension 284. Alternatively, other appropriate connectors or attachment means may be used to attach the bumper 282 to the extension 284. It is contemplated that a lift bag (not shown) may be used in place of the bumper 282. Alternatively, the bumper 282 may be used in conjunction with the lift bag.

The down stop assembly 280 also includes an engagement member 286. The engagement member 286 may be a separate component, such as a structure or surface, fixed to a portion of the frame 222 or the hanger 242 or may be integrally formed with the frame or the hanger. Depending on the arrangement of the bumper 282 and suspension assembly 240, the engagement member 286 may be an existing component of the frame 222, the hanger 242, or the beam 244. The engagement member 286 may be formed by any suitable process from any suitable material. Specifically, the engagement member 286 may be a bracket formed from bent sheet steel. The engagement member 286 may be disposed between, and attached to, one or more of the walls of the hanger 242 by any suitable means, such as fasteners or welds. Thus, the engagement member may be at least partially sheltered or protected by the hanger 242 and/or frame 222 of the heavy-duty vehicle. The engagement member 286 includes a surface 288 for contacting the bumper 282 to restrict pivotal movement of the beam 244 and axle 268. The configuration and relative positioning of the bumper 282 and the engagement member 286 determines the range of pivotal movement of the beam 244 and the axle 268. Specifically, downward pivotal movement of the beam 244 and axle 268 may be restricted to about 12°, or about 4 inches from a ride-height of the heavy-duty vehicle. It is further contemplated that the bumper 282 and/or engagement member 286 may be adjustable to allow for customized pivotal movement of the beam 244 and axle 268 for a particular heavy-duty vehicle application.

As illustrated in FIG. 7, the bumper 282 is spaced apart from, or not in contact with, the engagement member 286 or any component of the hanger 242 and/or the frame 222 of the heavy-duty vehicle when the beam 244 and axle 268 are at neutral ride-height. As illustrated in FIG. 8, as the beam 244 and axle 268 pivots downward in the direction D' (FIG. 8), the extension 284 pivots upward in the direction U', and the bumper 282 contacts and engages the surface 288 of the engagement member 286 or a component associated with the frame 222 and/or the hanger 242. The contact with the surface 288 restricts downward pivotal movement of the beam 244 and axle 268 about the pivotal connection 264. As a result, the limited pivotal movement of the beam 244 and axle 268 may prevent over-extension of, and avoid potential damage to, the air spring 270 and/or other components of the axle/suspension system 220 when the heavy-duty vehicle is lifted onto a railroad car, undergoes reverse braking, or strikes a pothole or other road hazard.

Accordingly, the axle/suspension system 120, 220 provides a new and improved, simple positive down stop assembly 180, 280 that requires fewer components and is effective, inexpensive, lightweight, and overcomes the disadvantages, drawbacks, and limitations of prior art axle/suspension systems. The axle/suspension system 120, 220 also provides a down stop assembly 180, 280 that is cost-efficient, relatively simpler, lighter, more compact, and protected from road splash and debris. Moreover, it is understood that, unlike the prior art down stops, the new and improved down stop assembly 180, 280 functions when exposed to compressive force rather than tension to limit downward pivotal movement of the beam 144, 244 and axle 168, 268.

In the description, certain terms have been used for brevity, clarity and understanding. No unnecessary limitations are to be implied from those terms beyond the requirements of the prior art, because such terms are used for descriptive purposes and are intended to be broadly construed. The description and illustration of the subject disclosure is by way of example, and the scope of the subject disclosure is not limited to the exact details shown or described. The axle/suspension systems 120, 220 of the subject disclosure could be utilized on heavy-duty trucks, trailers, buses, and the like without changing the overall concept or operation. The suspension assembly 140, 240 of the subject disclosure could be utilized on all types of axle/suspension systems, including those having either a trailing arm or leading arm configuration, without changing the overall concept or operation. The axle/suspension system 120, 220 of the subject disclosure could be made from other materials, have different shapes, sizes, or could be utilized on various types of heavy-duty vehicle frames or sub-frames that mount axle/suspension systems without changing the overall concept or operation.

Certain terminology is used for purposes of reference only and is not intended to be limiting. For example, terms such as "downward" refer to directions in the drawings to which reference is made. Terms such as "front", "rear", "downward", "upward", "forward", "rearward", "longitudinal", and "transverse", describe the orientation of portions of a component within a reference to the text and the associated drawings describing the subject under discussion. Such terminology may include the words specifically mentioned above, derivatives thereof, and words of similar import. Similarly, the terms "first", "second", and other such numerical terms referring to structures do not imply a sequence or order unless clearly indicated by the context.

Although the description has been shown and described with respect to one or more aspects, applications or implementations, it may occur to those skilled in the art based upon a reading and understanding of this description and the drawings that equivalent alterations and modifications may be made without detracting from the spirit and scope of the aspects or implementations in the description. The description is intended to include all such modifications and alterations.

What is claimed is:

1. An axle/suspension assembly for a heavy-duty vehicle, the axle/suspension assembly supported by a frame and a hanger of the heavy-duty vehicle, the axle/suspension assembly comprising:

a beam;
an axle supported by a first portion of the beam for pivotal movement relative to the hanger at a pivot joint, the first portion of the beam being located on a first side of the pivot joint; and
a bumper fixed to a second portion of the beam located on an opposite second side of the pivot joint, the bumper having a portion for contacting structure directly fixed to the hanger and indirectly connected with the frame to limit relative pivotal movement of the beam and the axle in one direction.

2. The axle/suspension assembly of claim 1 further including the beam being a trailing arm beam.

3. The axle/suspension assembly of claim 1 further including an engagement portion having a surface for contacting the bumper to limit pivotal movement of the beam and the axle in the one direction, the engagement portion being fixed to or integral with the hanger.

4. The axle/suspension assembly of claim 3 further including the engagement portion being disposed above the beam in order to protect the engagement portion from road debris.

5. The axle/suspension assembly of claim 1 further including the hanger having an inner wall and an outer wall;
wherein upon contacting the structure fixed to the hanger, the bumper is exposed to compressive force and disposed between the inner wall and outer wall of the hanger.

6. The axle/suspension assembly of claim 1 further including the hanger having an inner wall and an outer wall;
the the structure fixed to the hanger being disposed between the inner wall and outer wall of the hanger in order to protect the structure fixed to the hanger from road debris.

7. The axle/suspension assembly of claim 1 wherein the bumper functions when exposed to compressive force to limit pivotal movement of the axle in the one direction.

8. The axle/suspension assembly of claim 1 further including an air bag mounted to the first portion of the beam spaced from the axle in a direction away from the pivot joint.

9. An axle/suspension system for a heavy-duty vehicle, the axle/suspension system supported by a frame and a hanger of the heavy-duty vehicle, the axle/suspension system comprising:
a beam;
an axle supported by a first side of the beam for pivotal movement relative to the hanger at a pivot joint;
a structure mounted to the beam at a distance from the pivot joint, the structure adapted for contacting a component directly fixed to the hanger and indirectly connected with the frame, the structure functioning when exposed to compressive force to limit pivotal movement of the beam and the axle in one direction.

10. The axle/suspension system of claim 9 further including the structure being a bumper made of polymer or elastomer.

11. The axle/suspension system of claim 9 further including the beam being a trailing arm beam.

12. The axle/suspension system of claim 9 wherein the structure is mounted to the beam on a side of the pivot joint opposite the first side of the beam.

13. The axle/suspension system of claim 9 further including the component having an engagement portion with a surface for contact by the structure to limit pivotal movement of the beam and the axle.

14. An axle/suspension assembly for a heavy-duty vehicle, the axle/suspension assembly supported by a frame and a hanger of the heavy-duty vehicle, the axle/suspension system comprising:
a beam having a first portion and a second portion, the beam being operatively connected to the hanger at a pivot joint intermediate the first portion and second portion about which the beam has pivotal movement relative to the hanger;
the first portion of the beam extending from the pivot joint in a first direction;
the second portion of the beam extending from the pivot joint in a second direction opposite the first direction; and
structure mounted to the second portion of the beam, the structure adapted for contacting another structure directly fixed to the hanger and indirectly connected with the frame to limit pivotal movement of the beam.

15. The axle/suspension assembly of claim 14 further including the beam being a trailing arm beam.

16. The axle/suspension assembly of claim 14 further including an axle supported by the first portion of the beam.

17. The axle/suspension assembly of claim 14 wherein at least one of the structures functions when exposed to compressive force to limit downward pivotal movement of the beam.

18. The axle/suspension assembly of claim 17 further including at least one of the structures being a bumper fixed to the second portion of the beam, the bumper being adapted for contacting the other structure fixed to the hanger.

19. The axle/suspension assembly of claim 14 further including a lift bag associated with the frame, the lift bag being adapted for adjusting a ride height of the heavy-duty vehicle.

20. The axle/suspension assembly of claim 14 further including a lift bag associated with the axle/suspension assembly, the lift bag being adapted for adjusting a ride height of the heavy-duty vehicle.

* * * * *